US009001085B2

(12) United States Patent
Ha et al.

(10) Patent No.: US 9,001,085 B2
(45) Date of Patent: Apr. 7, 2015

(54) TOUCH SCREEN APPARATUS FOR DETERMINING ACCURATE TOUCH POINT COORDINATE PAIR

(75) Inventors: Joo Young Ha, Gyunggi-do (KR); Sun Mi Sin, Gyunggi-do (KR); In Cheol Chang, Gyunggi-do (KR); Jae Kwang Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 299 days.

(21) Appl. No.: 13/092,168

(22) Filed: Apr. 22, 2011

(65) Prior Publication Data

US 2012/0032924 A1 Feb. 9, 2012

(30) Foreign Application Priority Data

Aug. 6, 2010 (KR) .......................... 10-2010-0076106

(51) Int. Cl.
*G06F 3/042* (2006.01)
*G06F 3/041* (2006.01)

(52) U.S. Cl.
CPC ............ *G06F 3/0416* (2013.01); *G06F 3/0421* (2013.01); *G06F 3/0428* (2013.01); *G06F 2203/04104* (2013.01)

(58) Field of Classification Search
CPC ... G06F 3/0421; G06F 3/0423; G06F 3/0416; G06F 3/0428; G06F 2203/04104
USPC ......................................................... 345/175
See application file for complete search history.

(56) References Cited

U.S. PATENT DOCUMENTS

| 2001/0055006 | A1* | 12/2001 | Sano et al. ..................... 345/175 |
| 2009/0244018 | A1 | 10/2009 | Lin et al. |
| 2010/0309169 | A1* | 12/2010 | Lieberman et al. ........... 345/175 |
| 2010/0328246 | A1 | 12/2010 | Cho |

FOREIGN PATENT DOCUMENTS

| JP | 2001-318759 A | 11/2001 |
| KR | 100780181 B1 | 11/2007 |
| KR | 1020080101164 A | 11/2008 |
| KR | 1020080107547 A | 12/2008 |
| KR | 10-0913758 B1 | 8/2009 |

OTHER PUBLICATIONS

Notice of Office Action from Korean Intellectual Property Office for Application No. 10-2010-0076106, issued Sep. 29, 2011.

* cited by examiner

*Primary Examiner* — Chanh Nguyen
*Assistant Examiner* — John Kirkpatrick
(74) *Attorney, Agent, or Firm* — Lowe Hauptman & Ham LLC

(57) ABSTRACT

A touch screen apparatus includes a mirror part arranged on a side of a quadrilateral touch area, retroreflectors arranged on remaining three sides of the touch area, first and second light transmitting and receiving parts, each being disposed on each of two edges formed by one of the retroreflectors and emitting light to the touch area and detecting reflected light out of the emitted light by the mirror part and the retroreflectors, an angle extracting part calculating a plurality of light emitting angles for a location from which no reflected light is received, by at least one of the first and second light transmitting and receiving parts, and a coordinate generating part calculating a coordinate pair of a location in which light paths corresponding to the plurality of light emitting angles calculated by the angle extracting part intersect with each other.

2 Claims, 4 Drawing Sheets

TOUCH SCREEN APPARATUS FOR DETERMINING ACCURATE TOUCH POINT COORDINATE PAIR

CROSS-REFERENCE TO RELATED APPLICATIONS

This application claims the priority of Korean Patent Application No. 10-2010-0076106 filed on Aug. 6, 2010, in the Korean Intellectual Property Office, the disclosure of which is incorporated herein by reference.

BACKGROUND OF THE INVENTION

1. Field of the Invention

The present invention relates to a touch screen apparatus, and more particularly, to a touch screen apparatus capable of eliminating ghost points and determining the coordinate pair of an accurate touch point when two or more touch points are present within a touch area.

2. Description of the Related Art

In general, a touch screen is applied to a personal mobile terminal, such as a mobile phone or a PDA, and also applied to a field in which a touched location (i.e. pointed location) in a wide area, such as a large screen or a black board is indicated as coordinates. Detecting the coordinates of a touch on a small touch screen is realized through detecting the pressure of a touch or the change of capacitance because of the touch. However, a large touch screen is realized through calculating the coordinates of a point from which no reflected light is received during irradiating light to a touched area and receiving the irradiated light.

A large touch screen apparatus in the related art has a structure in which retroreflectors are provided on the continuous three sides of a quadrilateral touch area and light transmitting and receiving parts are disposed at the ends of the continuous three retroreflectors, respectively. Here, each of the light transmitting and receiving part irradiates light to the touch area and receives reflected light through a path identical to that of the light irradiated by the retroreflectors. This large touch screen apparatus in the related art, when a pointed location is present within the touch area, may detect where the pointed location is situated because the light transmitting and receiving parts fail to receive the reflected light from the irradiated light. Therefore, angles detected by the two light transmitting and receiving parts with respect to one reference line are obtained, thereby calculating the coordinate pair of the pointed location.

However, in this general large touch screen apparatus, when two or more pointed locations are present within the touch area, a plurality of angles are detected by each of the light transmitting and receiving parts. Thus, when the angles detected by the two light transmitting and receiving parts are combined, coordinate pairs which do not indicate actual pointed locations (i.e. ghost coordinate pairs) may be caused.

In the touch screen apparatus in the related art, there is provided no solution capable of solving the defect of the ghost coordinate pairs caused when the plurality of pointed locations are present within the touch area. Thus, there is a limitation that a user needs to use only one pointed location.

Therefore, a technique capable of confirming and eliminating the ghost coordinate pairs caused when a plurality of pointed locations, particularly two pointed locations, are present within the touch area is required in the art.

SUMMARY OF THE INVENTION

An aspect of the present invention provides a touch screen apparatus capable of eliminating ghost points and determining the coordinate pair of an exact touch point when two or more touch points are present within a touch area.

An aspect of the present invention also provides a touch screen apparatus capable of eliminating ghost points and determining the coordinate pair of an exact touch point with a very small amount of computational operations when two or more touch points are present within a touch area.

According to an aspect of the present invention, there is provided a touch screen apparatus including: a mirror part arranged on a side of a quadrilateral touch area; retroreflectors arranged on the remaining three sides of the touch area; first and second light transmitting and receiving parts, each being disposed on each of two edges formed by one of the retroreflectors and emitting light to the touch area and detecting reflected light out of the emitted light by the mirror part and the retroreflectors; an angle extracting part calculating a plurality of light emitting angles for a location from which no reflected light is received, by at least one of the first and second light transmitting and receiving parts; and a coordinate generating part calculating coordinate pair of a location in which light paths corresponding to the plurality of light emitting angles calculated by the angle extracting part intersect with each other.

The light emitting angles may be angles formed from the retroreflector located between the first light transmitting and receiving part and the second light transmitting and receiving part.

The angle extracting part may calculate a plurality of light emitting angles for a location from which no reflected light is received, by each of the first and second light transmitting and receiving parts, when the number of the light emitting angles extracted with respect to one light transmitting and receiving part is three or more.

The coordinate generating part may calculate coordinate pair of a location in which the light paths corresponding to the plurality of light emitting angles calculated with respect to the each of the first and second light transmitting and receiving parts intersect with each other.

The touch screen apparatus may further include a coordinate comparing part comparing coordinate pairs calculated with respect to the first light transmitting and receiving part with coordinate pairs calculated with respect to the second light transmitting and receiving part; and a coordinate determining part determining, as a pointed location, a location of a coordinate pair which is substantially the same between the coordinate pairs calculated with respect to the first light transmitting and receiving part and the coordinate pairs calculated with respect to the second light transmitting and receiving part, based on a comparison result of the coordinate comparing part.

When the pointed location includes two pointed locations, the coordinate comparing part compares all coordinate pairs calculated with respect to the first light transmitting and receiving part with coordinate pairs calculated by a maximum light emitting angle among the coordinate pairs calculated with respect to the second light transmitting and receiving part to determine a first pointed location, and determines, as a second pointed location, a coordinate pair formed by remaining light emitting angles other than the light emitting angles used for determining the first pointed location.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
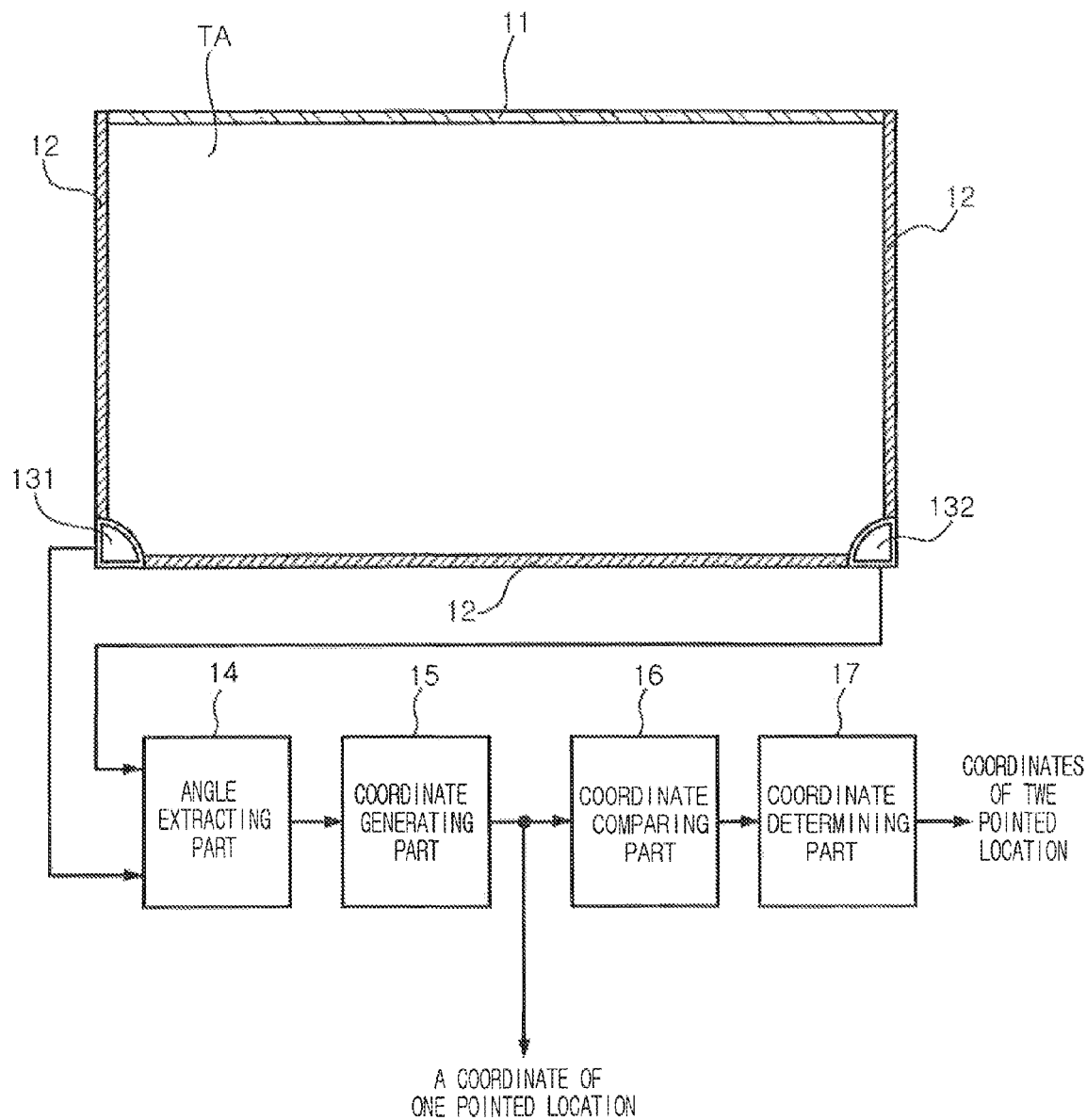
FIG. 1 is a block diagram illustrating a touch screen apparatus according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the dimension and the shape of components are exaggerated for clarity. Like reference numerals in the drawings denote like elements, and thus their description will be omitted.

FIG. 1 is a block diagram illustrating a touch screen apparatus according to an exemplary embodiment of the present invention.

As shown in FIG. 1, a touch screen apparatus according to an exemplary embodiment of the present invention may include a mirror part 11 and retroreflectors 12 arranged on the circumference of a touch area (TA), a first light transmitting and receiving part 131 and a second light transmitting and receiving part 132 transmitting (i.e. emitting) light to the TA and receiving incident light reflected by the mirror part 11 and the retroreflectors 12, an angle extracting part 14 calculating light emitting angles indicating a pointed location by using information inputted from the light transmitting and receiving parts 131 and 132, and a coordinate generating part 15 calculating the coordinate pair of a location in which light paths corresponding to the light emitting angles calculated by the angle extracting part 14 intersect with each other.

In addition to this, the touch screen apparatus according to an exemplary embodiment of the present invention may further include a coordinate comparing part 16 and a coordinate determining part 17. The coordinate comparing part 16 compares coordinate pairs determined by the first light transmitting and receiving part 131 with coordinate pairs determined by the second light transmitting and receiving part 132. The coordinate determining part 17 determines, as the coordinate pair of the pointed location, a coordinate pair which is determined to be substantially the same between the coordinate pairs calculated with respect to the first light transmitting and receiving part 131 and the coordinate pairs calculated with respect to the second light transmitting and receiving part 132, based on a comparison result of the coordinate comparing part.

The mirror part 11 may be arranged on one side of a quadrilateral touch area (TA). The mirror part 11 may generate a virtual image with respect to the pointed location within the TA and reflect at an angle identical to an angle at which light is incident thereon.

The retroreflectors 12 are arranged on the remaining three sides of the TA. Each of the retroreflectors 12 may reflect incident light through a path on which the light has been incident.

The first and the second light transmitting and receiving parts 131 and 132 transmit light to the entire surface of the TA and receive the reflected light of the transmitted light, reflected by the mirror part 11 and the retroreflectors 12. Due to the characteristics of the mirror part 11 and the retroreflectors 12, when the first and the second light transmitting and receiving parts 131 and 132 transmit the light in any direction, they may receive the reflected light of the transmitted light in a direction from which the light has been transmitted. Thus, when the pointed location is present within the TA, a location from which no reflected light is received due to the pointed location during transmitting the light and receiving the reflected light of the transmitted light by the first and the second light transmitting and receiving parts 131 and 132, may be present within the TA.

The angle extracting part 14 calculates the light emitting angles for the location in which no reflected light is received by the first and second light transmitting and receiving parts 131 and 132. The coordinate generating part 15 may calculate the coordinate pair of a point at which light paths corresponding to the light emitting angles calculated by the angle extracting part 14 intersect with each other.

When only one pointed location is present within the TA, the coordinate pair of the pointed location may be generated by two light emitting angles formed by one of the first and second light transmitting and receiving parts 131 and 132. Namely, when only one pointed location is present within the TA, the coordinate generating part 15 generates only one coordinate pair since no ghost coordinate pair occurs within the TA. Thus, when only one pointed location is present within the TA, the output of the coordinate generating part 15 is exactly the same as the pointed location.

However, when two or more pointed locations are present within the TA, ghost coordinate pairs are generated. Thus, it is required to calculate the coordinate pairs by using both of the two first and second light transmitting and receiving parts 131 and 132, and compare the coordinate pairs calculated with respect to the first light transmitting and receiving part 131 with the coordinate pairs calculated with respect to the second light transmitting and receiving part 132.

For this, the touch screen apparatus may further include the coordinate comparing part 16 and the coordinate determining part 17.

The coordinate comparing part 16 may compare the coordinate pairs determined by the first light transmitting and receiving part 131 with the coordinate pairs determined by the second light transmitting and receiving part 132.

Moreover, the coordinate determining part 17 may determine the coordinate pair which is determined to be substantially the same between the coordinate pairs calculated with respect to the first light transmitting and receiving part 131 and the coordinate pairs calculated with respect to the second light transmitting and receiving part 132, based on the comparison result of the coordinate comparing part 16. Further, the coordinate determining part 17 may determine, as the coordinate pair of an actual pointed location which is not a ghost coordinate pair, the common coordinate pair determined to be substantially the same with respect to the two transmitting and receiving parts 131 and 132.

Hereinafter, the operations and effects of a touch screen apparatus according to an exemplary embodiment of the present invention will be described in detail with reference to the accompanying drawings, and the touch screen apparatus has the aforementioned configurations.

Figure 2:
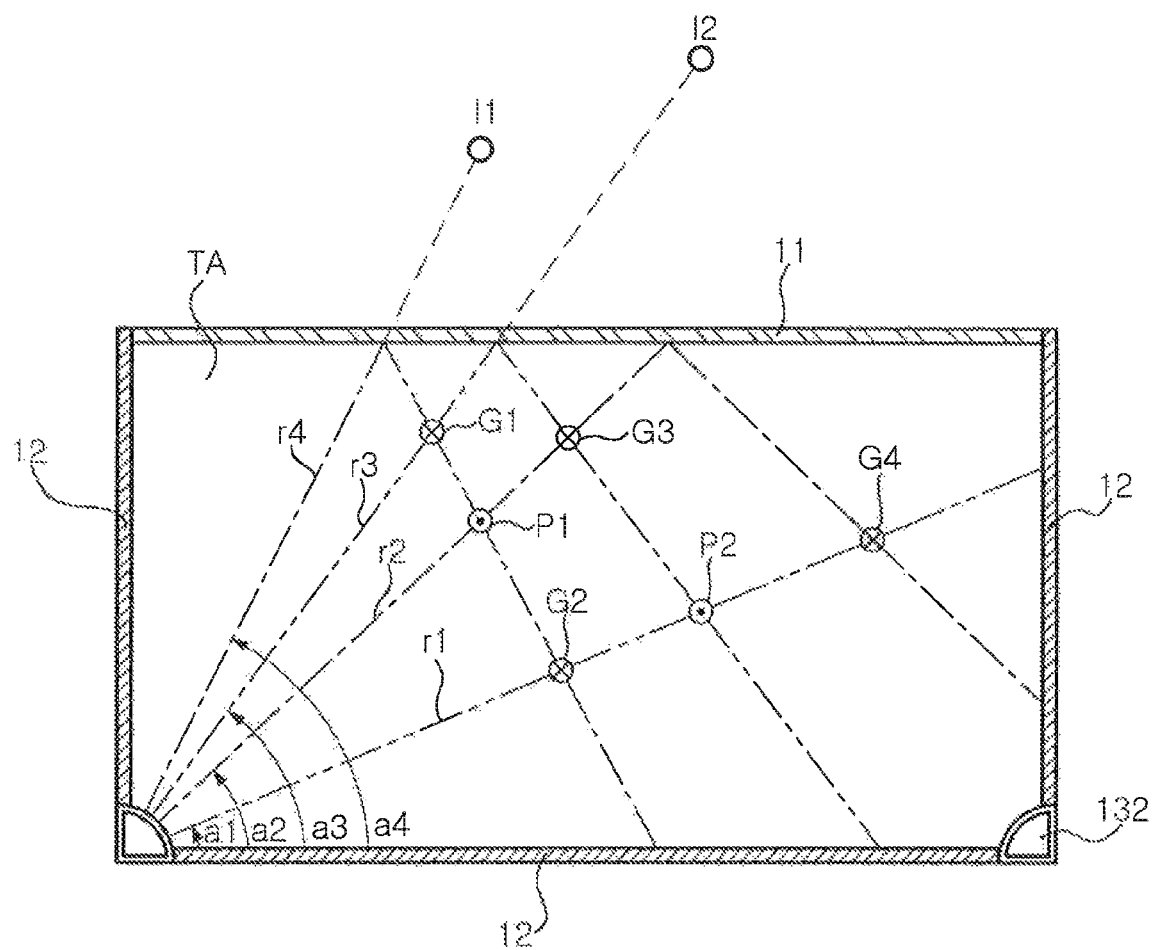
FIG. 2 is a diagram illustrating an example of ghost coordinate pairs and light emitting angles generated by a first light transmitting and receiving part when two or more pointed locations are present within a touch area in a touch screen apparatus according to an exemplary embodiment of the present invention.

FIG. 2 is a diagram illustrating an example of ghost coordinate pairs and light emitting angles generated by the first light transmitting and receiving part when two or more pointed locations are present within a touch area in a touch screen apparatus according to an exemplary embodiment of the present invention.

Referring to FIG. 2, a case in which one pointed location is present within the touch area will be explained.

In FIG. 2, in the case in which a pointer is present on a first pointed location P1, light directly passing the first pointed location P1 after being transmitted by the first light transmitting and receiving part 131 is blocked by the pointer. Thus, no reflected light is received by the first light transmitting and receiving part 131.

In FIG. 2, in the case in which no pointer is present on the first pointed location P1, light transmitted by the first light transmitting and receiving part 131 and passing the first pointed location P1, indicated by light path r2, is reflected by the mirror part 11 and being incident on retrorelector 12. This reflected light is re-reflected to the mirror part 11 by the retrorelector 12 through a path through which the light has been incident on the retrorelector 12, as it is. The re-reflected light is reflected from the mirror part 11 again and passes the first pointed location P1, thereby being received by the first light transmitting and receiving part 131. That is, the light transmitted through the light path indicated by 'r2' by the first light transmitting and receiving part 131 is reflected through the same path, and then received by the light transmitting and receiving part 131.

Therefore, when the pointer is present on the first pointed location P1, no light is received by the light transmitting and receiving part 131 through the light path r2.

In a similar manner, light reflected by the mirror part 11 and then passing the first pointed location P1 after being transmitted by the first light transmitting and receiving part 131 is also blocked by the pointer existing on the first pointed location P1, no reflected light is received by the first light transmitting and receiving part 131. The light reflected by the mirror part 11 and then passing the first pointed location P1, after being transmitted by the first light transmitting and receiving part 131, may be considered to be light being incident on a virtual image I1 formed by the mirror part 11 with respect to the first pointed location P1. In other words, no light is received by the light transmitting and receiving part 131, through a light path r4 being incident on the mirror part with respect to the first pointed location P1 and then passing the first pointed location P1.

Like this, when one pointed location is present within the touch area, the light paths r2 and r4 exist, through which reflected light for light being directly incident on the pointed location and reflected light for light being incident on the pointed location through the mirror part 11 are not received by one of the light transmitting and receiving parts.

With respect to the two light paths, the angle extracting part 14 calculates angles on the basis of the same location. In other words, the angle extracting part 14 calculates two light emitting angles for a location from which no reflected light is received by the first light transmitting and receiving part 131. These angles (light emitting angles) may be defined as angles formed from the retroreflector located between the first and second transmitting and receiving parts 131 and 132. Thus, the angle extracting part 14 calculates angles a2 and a4 for the two light paths r2 and r4.

The coordinate generating part 15 may calculate the coordinate pair of the first pointed location P1 by using the angles a2 and a4, the size of the TA, and the location information of the first light transmitting and receiving part 131. That is, according to an exemplary embodiment of the present invention, since the size of the TA and the location information of the first light transmitting and receiving part 131 are previously determined, the coordinate pair of the first pointed location P1 may be generated by calculating only the angles a2 and a4 of the light paths formed by the first pointed location P1.

Next, a case in which two pointed locations are present within the touch area will be explained.

Similarly to the aforementioned case in which one pointed location is present within the TA, even in the case in which two pointed locations P1 and P2 are present within the touch area, two light paths for each of the pointed locations P1 and P2 may be determined by the first light transmitting and receiving part 131, respectively, as shown in FIG. 2. Thus, the angle extracting part 14 may calculate four angles for a total of four light paths by the first light transmitting and receiving part 131. When the coordinate generating part 15 forms a total of six coordinate pairs by using these four angles. Among the six coordinate pairs formed by the coordinate generating part 15, a coordinate pair formed by the angle a1 and angle a3, and a coordinate pair formed by the angle a2 and the angle a4 are the coordinate pairs of actual pointed locations. The remaining four coordinate pairs generated by combining any two angles among four angles a1 to a4, other than the combination of the angle a1 and angle a3 and the combination of the angle a2 and the angle a4, are ghost coordinate pairs G1 to G4, not the coordinate pairs of the actual pointed locations.

In order to determine these ghost coordinate pairs G1 to G4, in an exemplary embodiment of the present invention, both of the two light transmitting and receiving parts 131 and 132 may be used to generate coordinate pairs when two or more pointed locations are present within the touch area.

Figure 3:
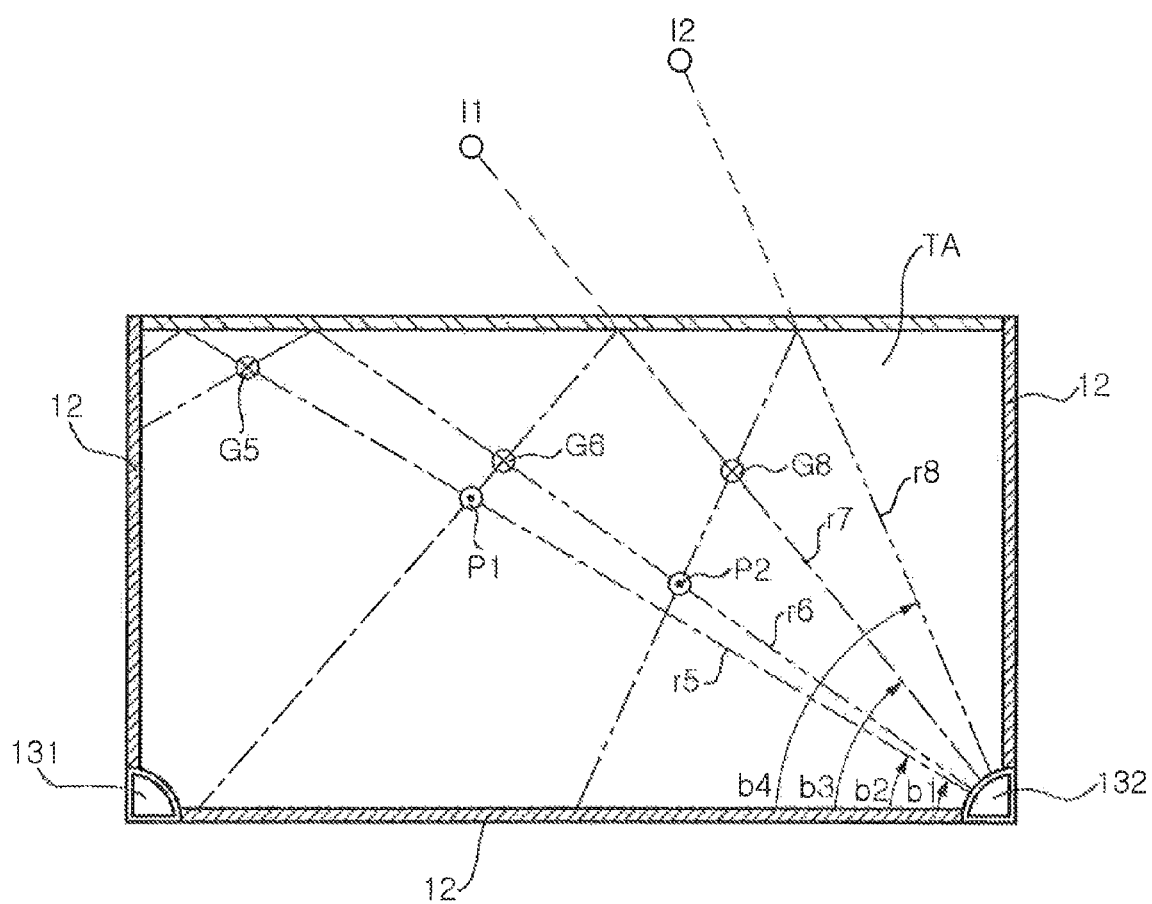
FIG. 3 is a diagram illustrating an example of ghost coordinate pairs and light emitting angles generated by a second light transmitting and receiving part when two or more pointed locations are present within a touch area in a touch screen apparatus according to an exemplary embodiment of the present invention.

FIG. 3 is a diagram illustrating an example of ghost coordinate pairs and light emitting angles generated by the second light transmitting and receiving part when two or more pointed locations are present within a touch area in a touch screen apparatus according to an exemplary embodiment of the present invention.

Similarly to the explanation of FIG. 2, the second light transmitting and receiving part 132 outputs four light paths through which no light is reflected, with respect to the first pointed location P1 and the second pointed location P2. The angle extracting part 14 calculates angles b1 to b4 with respect to the four light paths through which no light is reflected by the second light transmitting and receiving part 132. The coordinate generating part 15 may combine any two angles among the angles b1 to b4, thereby generating a total of six coordinate pairs. Among the six coordinate pairs generated by the coordinate generating part 15, a coordinate pair formed by the angle b1 and angle b3, and a coordinate pair formed by the angle b2 and the angle b4 are the coordinate pairs of the actual pointed locations P1 and P2. The remaining four coordinate pairs generated by combining any two angles among four angles b1 to b4, other than the combination of the angle b1 and angle b3, the combination of the angle b2 and the angle b4 are ghost coordinate pairs.

In an exemplary embodiment of the present invention, the coordinate comparing part 16 compares the six coordinate pairs, generated by the coordinate generating part 15 with respect to the first light transmitting and receiving part 131, with the six coordinate pairs, generated by the coordinate generating part 15 with respect to the second light transmitting and receiving part 132. The coordinate determining part 17 may determine, as the actual pointed location, a coordinate pair which is determined to be substantially the same among the compared coordinate pairs. The definition of "the coordinate pair of the location which is determined to be substantially the same" may include coordinate pairs having a small difference therebetween and coordinate pairs having a difference therebetween less than a predetermined threshold value, as well as coordinate pairs which are exactly equal to each other. The meaning of "the coordinate pair of the location which is determined to be substantially the same" will be understood as a coordinate pair disposed within any acceptable error range through a practical system configuration.

Like this, the touch screen apparatus according to present invention may eliminate the ghost coordinate pairs and determine the actual pointed locations by comparing the coordinate pairs generated by the first light transmitting and receiving part with the coordinate pairs generated by the second light transmitting and receiving part.

Meanwhile, an exemplary embodiment of the present invention provides a method of comparing coordinate pairs and a method of determining coordinate pairs, which are capable of reducing the amount of computational operation for determining the pointed locations, when two or more pointed locations are present in the TA. This method is shown in FIG. 4.

Figure 4:
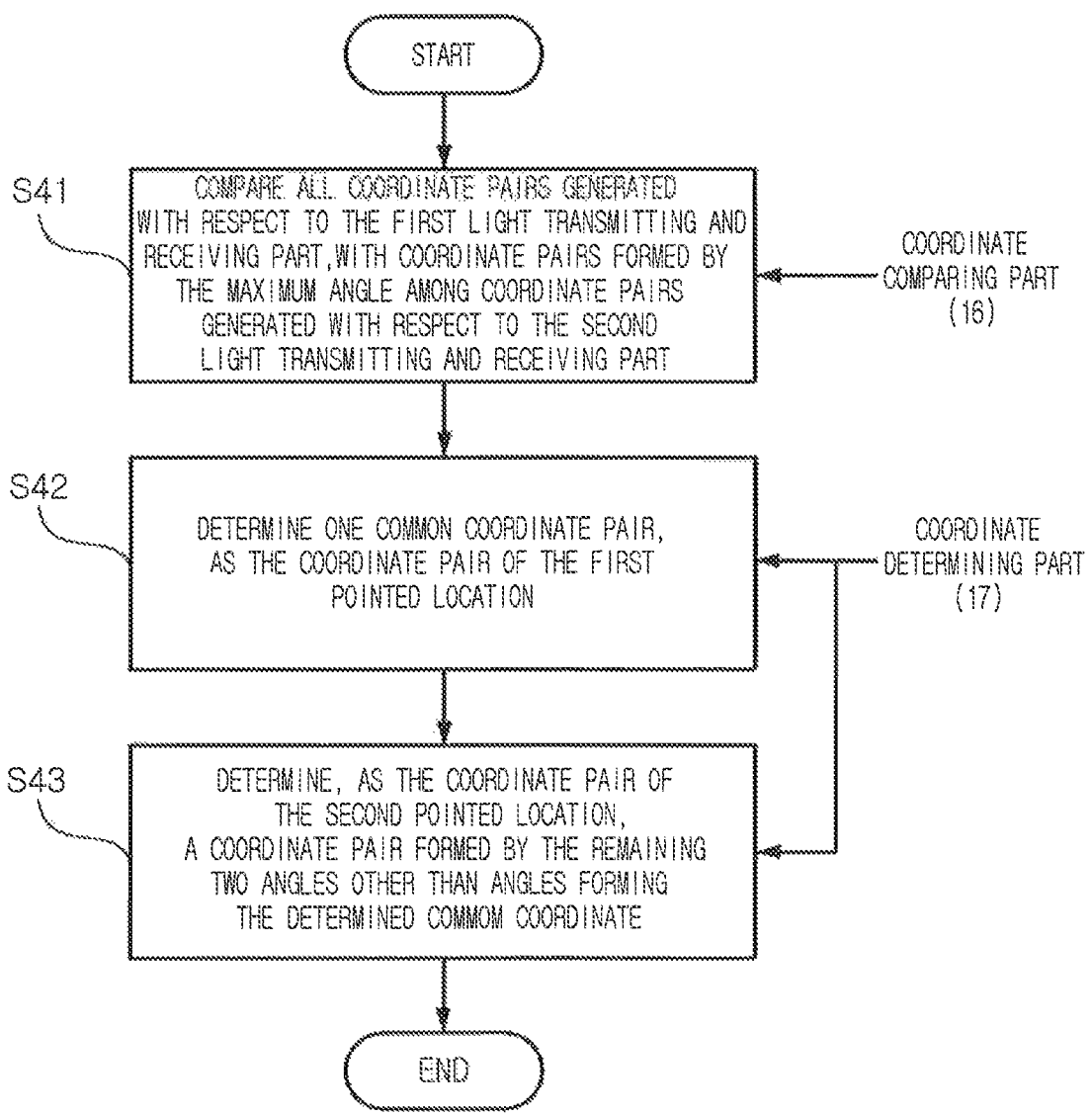
FIG. 4 is flowchart illustrating a method of determining coordinate pairs of two pointed locations applied to a touch screen apparatus according to an exemplary embodiment of the present invention.

FIG. 4 is flowchart illustrating a method of determining the coordinate pairs of two pointed locations, applied to a touch screen apparatus according to an exemplary embodiment of the present invention.

In operation S41 shown in FIG. 4, the coordinate comparing part 16 does not compare all of the six coordinate pairs generated from the coordinate generating part 15 with respect to the first light transmitting and receiving part 131, all of the six coordinate pairs generated from the coordinate generating part 15 with respect to the second light transmitting and receiving part 132. For example, the coordinate comparing part 16 compares the six coordinate pairs generated from the coordinate generating part 15 with respect to the first light transmitting and receiving part 131, with three coordinate pairs formed by the maximum angle b4 among the six coordinate pairs generated from the coordinate generating part 15 with respect to the second light transmitting and receiving part 132.

As shown in FIG. 2 and FIG. 3, the coordinate pair determining the actual pointed location is determined by a light path directly incident to the pointed location and a light path reflected by the mirror part 11 and then being incident to the pointed location. The maximum angle among angles formed by each of the first and second light transmitting and receiving parts 131 and 132 is always the angle of light being incident to the mirror part 11 at first. Thus, the maximum angle among the angles formed by each of the light transmitting and receiving parts 131 and 132 may always be used for determining one actual pointing coordinate pair.

Thus, as aforementioned, in the operation S41, the coordinate comparing part 16 compares the six coordinate pairs generated from the coordinate generating part 15 with respect to the first light transmitting and receiving part 131, with the three coordinate pairs formed by the maximum angle b4 among the six coordinate pairs generated from the coordinate generating part 15 with respect to the second light transmitting and receiving part 132. In operation S42, the coordinate determining part 17 determines one common coordinate pair as the coordinate pair of one pointed location.

In operation S43, the coordinate determining part 17 may confirm two angles forming the determined coordinate pair of the one pointed location, and determine, as the coordinate pair of the other pointed location, a coordinate pair formed by the remaining two angles other than the two angles forming the coordinate pair of this one pointed location. As shown in FIG. 2 and FIG. 3, when two pointed locations are present within the touch area, each pointed location is calculated by two angles. The two angles forming one pointed location do not overlap with the remaining angles forming the other pointed location. Accordingly, once one pointed location is determined, the other pointed location may be determined by using the remaining angles other than angles forming the determined pointed location.

When two pointed locations are present within the touch area, in the case in which all of the coordinate pairs calculated by the both light transmitting and receiving parts 131 and 132 are compared with one another, a comparison operation of thirty six times (6×6) is required. However, by using a method illustrated in FIG. 4, the number of times required for the comparison operation may be reduced by half.

As set forth above, according to exemplary embodiments of the invention, there is provided a touch screen apparatus capable of eliminating ghost points and determining the exact coordinate pairs of touch points when the plurality of touch points of two or more are present within the touch area.

More particularly, there is provided a touch screen apparatus capable of eliminating ghost points and determining the exact coordinate pairs of touch points with very small amount of computational operations when two touch points are present within a touch area.

While the present invention has been shown and described in connection with the exemplary embodiments, it will be apparent to those skilled in the art that modifications and variations can be made without departing from the spirit and scope of the invention as defined by the appended claims.

What is claimed is:

1. A touch screen apparatus comprising:
a quadrilateral touch area;
a mirror part arranged on one side of the quadrilateral touch area;
retroreflectors arranged on remaining three sides of the touch area;
a first light transmitting and receiving part and a second light transmitting and receiving part respectively disposed on two corners defined by the retroreflectors, each of the first and second light transmitting and receiving parts being configured to emit light to the touch area and to detect reflected light of the emitted light, the reflected light being reflected by the mirror part and the retroreflectors;
an angle extracting part configured to
calculate a plurality of first light emitting angles when the number of first light emitting angles is two, and
calculate both the plurality of first light emitting angles and a plurality of second light emitting angles when the number of the first light emitting angles is three or more, where the first light emitting angles and the second light emitting angles are angles for which no reflected light is received by the first light transmitting and receiving part and the second light transmitting and receiving part, respectively;
a coordinate generating part configured to
calculate a coordinate pair of a first location when the number of first light emitting angles is two, and calculate both a coordinate pair of each of a plurality of first locations and a coordinate pair of each of a plurality of second locations when the number of the first light emitting angles is three or more, where the first locations are locations in which light paths defined by the plurality of first light emitting angles respectively intersect with each other, and the second locations are locations in which light paths defined by the plurality of second light emitting angles respectively intersect with each other;

a coordinate comparing part configured to compare the coordinate pairs of the first locations with the coordinate pairs of the second locations; and a coordinate determining part configured to determine at least one pointed location which has substantially the same coordinate pair as one of the first locations and as one of the second locations, wherein when the at least one pointed location includes a first pointed location and a second pointed location, the coordinate comparing part is configured to compare
(i) the coordinate pairs of all the first locations with
(ii) the coordinate pairs of the second locations formed by a maximum second light emitting angle with the other second light emitting angles, and the coordinate determining part configured to
determine a first pointed location as a location having a common coordinate pair between (i) and (ii), and
determine the second pointed location as the second location formed by remaining second light emitting angles other than the second light emitting angles that form the first pointed location.

2. The touch screen apparatus of claim 1, wherein the first light emitting angles include angles of first light rays formed with respect to the retroreflector located between the first light transmitting and receiving part and the second light transmitting and receiving part, the first light rays emitted by the first light transmitting and receiving part, and the second light emitting angles include angles of second light rays formed with respect to the retroreflector located between the first light transmitting and receiving part and the second light transmitting and receiving part, the second light rays emitted by the second light transmitting and receiving part.

* * * * *